(12) United States Patent
Widenhorn et al.

(10) Patent No.: US 10,151,488 B2
(45) Date of Patent: Dec. 11, 2018

(54) APPARATUS AND METHODS FOR TREATING AND/OR UTILIZING A GASEOUS MEDIUM

(71) Applicant: Dürr Systems GmbH, Bietigheim-Bissingen (DE)

(72) Inventors: Axel Widenhorn, Stuttgart (DE); Roland Stoll, Pforzheim (DE)

(73) Assignee: DÜRR SYSTEMS GMBH, Bietigheim-Bissingen (DE)

( * ) Notice: Subject to any disclaimer, the term of this patent is extended or adjusted under 35 U.S.C. 154(b) by 356 days.

(21) Appl. No.: 14/833,822

(22) Filed: Aug. 24, 2015

(65) Prior Publication Data

US 2015/0362195 A1  Dec. 17, 2015

Related U.S. Application Data

(63) Continuation-in-part of application No. PCT/EP2014/053630, filed on Feb. 25, 2014.

(30) Foreign Application Priority Data

Feb. 28, 2013  (DE) .......................... 10 2013 203 448

(51) Int. Cl.
*F23R 3/42* (2006.01)
*F23M 5/08* (2006.01)
(Continued)

(52) U.S. Cl.
CPC ................... *F23R 3/42* (2013.01); *F02C 3/04* (2013.01); *F02C 7/20* (2013.01); *F23C 3/006* (2013.01);
(Continued)

(58) Field of Classification Search
CPC .......... F02C 3/04; F02C 7/20; F05D 2260/30; F23C 3/006; F23C 2900/03004;
(Continued)

(56) References Cited

U.S. PATENT DOCUMENTS 3,007,778 A * 11/1954 Wood ...................... C10B 55/10
                                                            422/144
2,725,950 A   12/1955 Christiansen
(Continued)

FOREIGN PATENT DOCUMENTS

CN   201866777   6/2011
DE   2236372    2/1974
(Continued)

OTHER PUBLICATIONS

Teculescu EP0560678A1.*
(Continued)

*Primary Examiner* — Ehud Gartenberg
*Assistant Examiner* — Scott Walthour
(74) *Attorney, Agent, or Firm* — Hanley, Flight & Zimmerman, LLC

(57) ABSTRACT

Example apparatus and methods providing for the improved chemical conversion of the combustible components of a gaseous medium are disclosed. In some examples, the apparatus includes a guiding body that guides the flow of the gaseous medium within a reaction chamber of the apparatus. In some examples, the guiding body of the disclosed apparatus is configured to stabilize a residence period of the gaseous medium in the reaction chamber. In some examples, the guiding body results in a flow path of the gaseous medium within the reaction chamber being optimized and/or maximized, and/or results in a short circuit flow of the gaseous medium in the reaction chamber being suppressed. In some disclosed examples, the guiding body causes at least a portion of the flow path of the gaseous medium within the reaction chamber to take the form of a cyclone flow.

28 Claims, 10 Drawing Sheets

(51) Int. Cl.
| | |
|---|---|
| *F23M 9/06* | (2006.01) |
| *F23M 9/10* | (2006.01) |
| *F23R 3/52* | (2006.01) |
| *F02C 7/20* | (2006.01) |
| *F23G 7/06* | (2006.01) |
| *F23R 3/58* | (2006.01) |
| *F23G 5/44* | (2006.01) |
| *F23R 3/60* | (2006.01) |
| *F23M 5/04* | (2006.01) |
| *F23M 5/00* | (2006.01) |
| *F23M 9/08* | (2006.01) |
| *F23C 3/00* | (2006.01) |
| *F23G 5/32* | (2006.01) |
| *F23G 5/46* | (2006.01) |
| *F02C 3/04* | (2006.01) |

(52) U.S. Cl.
CPC ............. *F23G 5/32* (2013.01); *F23G 5/442* (2013.01); *F23G 5/46* (2013.01); *F23G 7/06* (2013.01); *F23G 7/061* (2013.01); *F23G 7/065* (2013.01); *F23G 7/066* (2013.01); *F23G 7/068* (2013.01); *F23M 5/00* (2013.01); *F23M 5/04* (2013.01); *F23M 5/08* (2013.01); *F23M 5/085* (2013.01); *F23M 9/06* (2013.01); *F23M 9/08* (2013.01); *F23M 9/10* (2013.01); *F23R 3/52* (2013.01); *F23R 3/58* (2013.01); *F23R 3/60* (2013.01); *F05D 2260/30* (2013.01); *F23C 2900/03004* (2013.01); *F23G 2202/30* (2013.01); *F23G 2203/30* (2013.01); *F23G 2206/203* (2013.01); *F23M 2700/005* (2013.01); *F23M 2900/05002* (2013.01); *F23M 2900/09062* (2013.01); *F23R 2900/00001* (2013.01); *F23R 2900/00005* (2013.01); *F23R 2900/03342* (2013.01); *Y02E 20/12* (2013.01)

(58) Field of Classification Search
CPC ... F23G 5/32; F23G 5/442; F23G 5/46; F23G 7/06; F23G 7/061; F23G 7/065; F23G 7/066; F23G 7/068; F23G 2202/30; F23G 2203/30; F23G 2206/203; F23G 2209/14; F23M 5/00; F23M 5/04; F23M 5/06; F23M 5/08; F23M 5/085; F23M 9/06; F23M 9/08; F23M 9/10; F23M 2700/005; F23M 2900/05002; F23M 2900/09062; F23R 3/42; F23R 3/52; F23R 3/58; F23R 3/60; F23R 2900/00001; F23R 2900/00005; F23R 2900/03342
See application file for complete search history.

(56) References Cited

U.S. PATENT DOCUMENTS

| | | | | |
|---|---|---|---|---|
| 3,012,402 | A * | 12/1961 | Probert | F23R 3/425 110/264 |
| 4,339,924 | A * | 7/1982 | White | F23C 6/047 60/733 |
| 4,850,857 | A * | 7/1989 | Obermuller | F23G 7/066 422/203 |
| 4,969,406 | A | 11/1990 | Buzetzki | |
| 5,024,170 | A * | 6/1991 | Santanam | F23C 3/006 110/264 |
| 5,145,362 | A * | 9/1992 | Obermueller | F23G 7/066 110/211 |
| 5,200,155 | A * | 4/1993 | Obermueller | F23G 7/066 110/203 |
| 5,592,811 | A | 1/1997 | Dodge et al. | |
| 6,079,974 | A | 6/2000 | Thompson | |
| 6,862,877 | B1 * | 3/2005 | James | F02C 3/205 110/264 |
| 6,895,760 | B2 | 5/2005 | Kesseli | |
| 2009/0320726 | A1 | 12/2009 | Loving | |

FOREIGN PATENT DOCUMENTS

| | | | | |
|---|---|---|---|---|
| DE | 2417167 | | 10/1975 | |
| DE | 4344700 | | 6/1995 | |
| DE | 69618002 | | 7/2002 | |
| DE | 10140422 | | 11/2002 | |
| DE | 102010012005 | | 9/2011 | |
| EP | 0040690 | | 12/1981 | |
| EP | 0350512 | | 1/1990 | |
| EP | 0560678 | A1 * | 9/1993 | ............. F23G 5/46 |
| EP | 0679840 | | 11/1995 | |
| GB | 2153985 | | 8/1985 | |
| WO | 0109547 | | 2/2001 | |
| WO | 2012089837 | A1 | 7/2012 | |
| WO | 2014131759 | A2 | 9/2014 | |
| WO | 2014131759 | A3 | 9/2015 | |

OTHER PUBLICATIONS

German Patent Office, "Search Report," issued in connection with German Patent Application No. 10 2013 203 448.2, dated Oct. 10, 2013, (5 pages).

Patent Cooperation Treaty, "International Search Report", issued in connection with PCT Application No. PCT/EP2014/053630, dated Feb. 2, 2015, (13 pages).

Patent Cooperation Treaty, "Written Opinion", issued in connection with PCT Application No. PCT/EP2014/053630, dated Feb. 2, 2015, (15 pages).

Patent Cooperation Treaty, English Translation of "International Preliminary Report on Patentability", issued in connection with PCT Application No. PCT/EP2014/053630, dated Sep. 11, 2015, (22 pages).

* cited by examiner

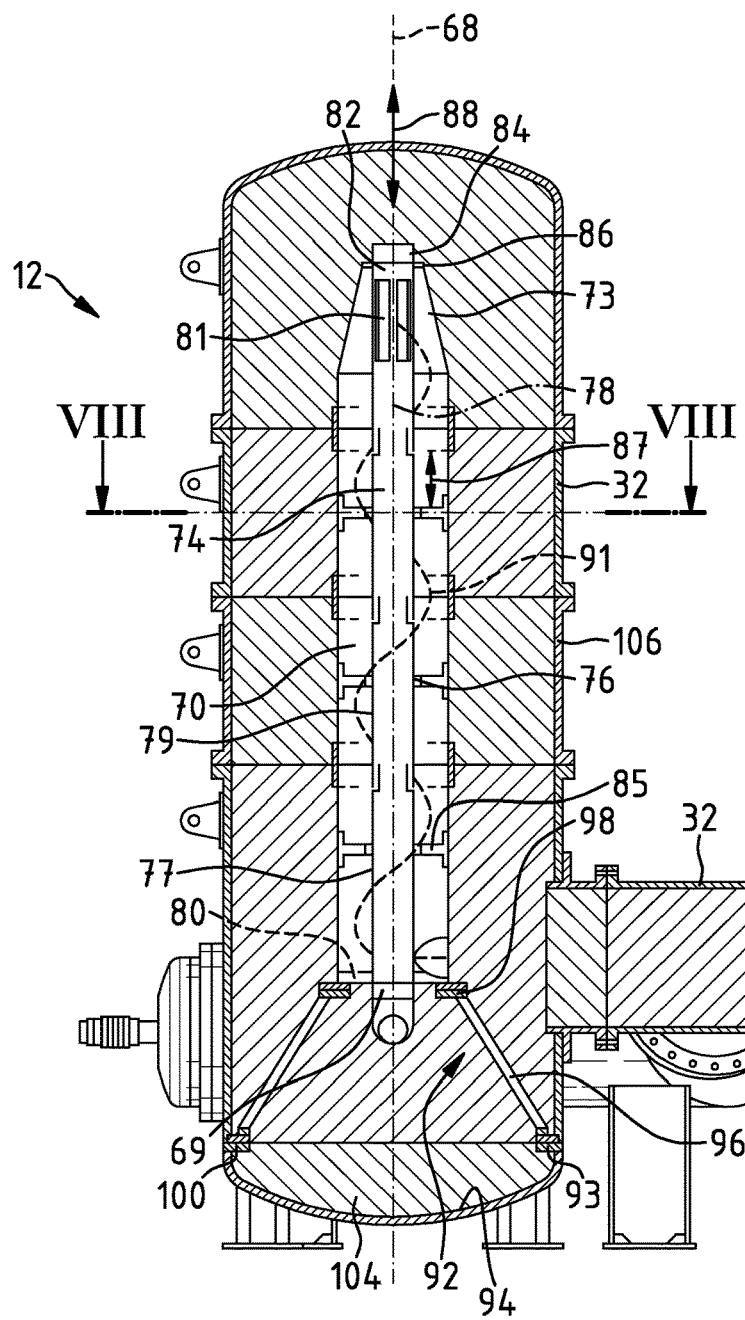
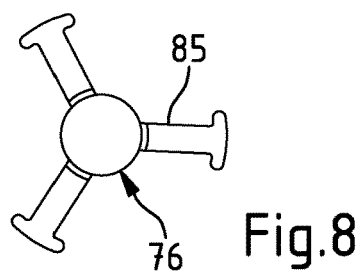
Fig. 7
Fig. 8

APPARATUS AND METHODS FOR TREATING AND/OR UTILIZING A GASEOUS MEDIUM

RELATED APPLICATION

This patent arises from a continuation-in-part of International Patent Application No. PCT/EP2014/053630, which was filed on Feb. 25, 2014, which claims priority to German Patent Application No. 10 2013 203 448.2, which was filed on Feb. 28, 2013. The foregoing International Patent Application and German Patent Application are hereby incorporated herein by reference in their entireties.

FIELD OF THE DISCLOSURE

This disclosure relates generally to an apparatus for treating a gaseous medium containing combustible components, and, more particularly, to an apparatus providing improved chemical conversion of the combustible components of the gaseous medium by guiding the flow of the gaseous medium within a reaction chamber of the apparatus.

BACKGROUND

A known apparatus for treating and/or utilizing the energy of a gaseous medium containing combustible components is described in U.S. Pat. No. 5,592,811. The known apparatus includes a burner having a heatable combustion chamber, a feed duct for feeding the gaseous medium into the combustion chamber, and a cylindrical reaction chamber through which the gaseous medium can flow. The reaction chamber of the known apparatus includes an inlet through which the gaseous medium flows into the reaction chamber and an outlet through which the gaseous medium passes out of the reaction chamber into a hot gas duct that discharges the treated gaseous medium from the reaction chamber.

The known apparatus is designed for treating hydrocarbon-containing exhaust air. The known apparatus includes a pressure container in which a cylindrical reaction chamber is formed. In the known apparatus, a compressor feeds the hydrocarbon-containing exhaust air into the reaction chamber. A burner of the known apparatus includes a flame tube directed laterally into the reaction chamber. The exhaust air is admitted via the flame tube into the reaction chamber where the exhaust air is swirled.

In the known apparatus, the flow path of the gaseous medium through the reaction chamber may differ in length, which disadvantageously results in non-uniform residence periods for the gaseous medium in the reaction chamber. Thus, a uniform chemical conversion of the combustible components of the gaseous medium is not readily possible in the known apparatus.

BRIEF DESCRIPTION OF THE DRAWINGS

FIG. 7 shows an alternative embodiment of the example reaction chamber of FIGS. 4-5.

FIG. 8 shows a partial cross-sectional view of the example reaction chamber of FIG. 7 taken along line VIII-VIII of FIG. 7.

Figure 1:
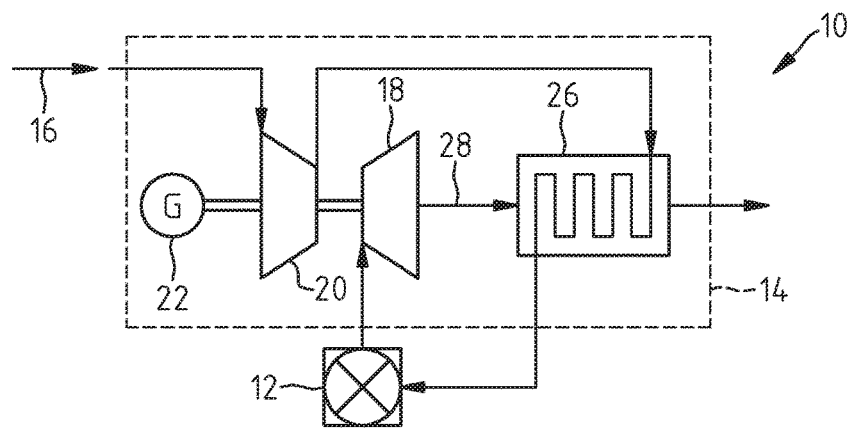
FIG. 1 shows a block diagram of an example energy generation system including an example apparatus for treating and utilizing the energy of a gaseous medium containing combustible components.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

The examples disclosed herein providing for the improved chemical conversion of the combustible components of a gaseous medium. Particularly, the examples disclosed herein provide an apparatus including a guiding body that guides the flow of the gaseous medium within a reaction chamber of the apparatus.

In accordance with the teachings of this disclosure, the guiding body of the example apparatus disclosed herein is configured to stabilize a residence period of the gaseous medium, in particular of an exhaust gas flow, in the reaction chamber. In some examples, the guiding body results in a flow path of the gaseous medium, in particular of the exhaust gas flow, within the reaction chamber being optimized and/or maximized, and/or results in a short circuit flow of the gaseous medium, in particular of the exhaust gas flow, in the reaction chamber being suppressed.

As used herein, "stabilizing the residence period" refers to the residence periods of individual partial quantities of the gaseous medium having only small scatter, and preferably virtually no scatter, with respect to the residence periods thereof in the reaction chamber. As used herein, "small scatter" refers to a dispersion of the individual residence periods of less than 50%, in particular less than 30%, preferably of less than 20%, and particularly preferably of less than 10%. For example, small scatter may arise when the residence period of 66% of the gaseous medium that is fed into the reaction chamber fluctuates in the reaction chamber by less than 50%, in particular less than 30%, preferably by less than 20%, and particularly preferably by less than 10%. As used herein, "maximizing the flow path" refers to optimizing a length of the flow path at a given volumetric flow of the gaseous medium and given geometrical dimensions of the reaction chamber. In some examples disclosed herein, an adaptation of an increase in a cyclone flow can be influenced in the sense of maximizing the flow path. As used herein, a "cyclone flow" refers to a fluid flow in which the fluid is moved around a longitudinal axis on helical or substantially helical flow lines.

Figure 2:
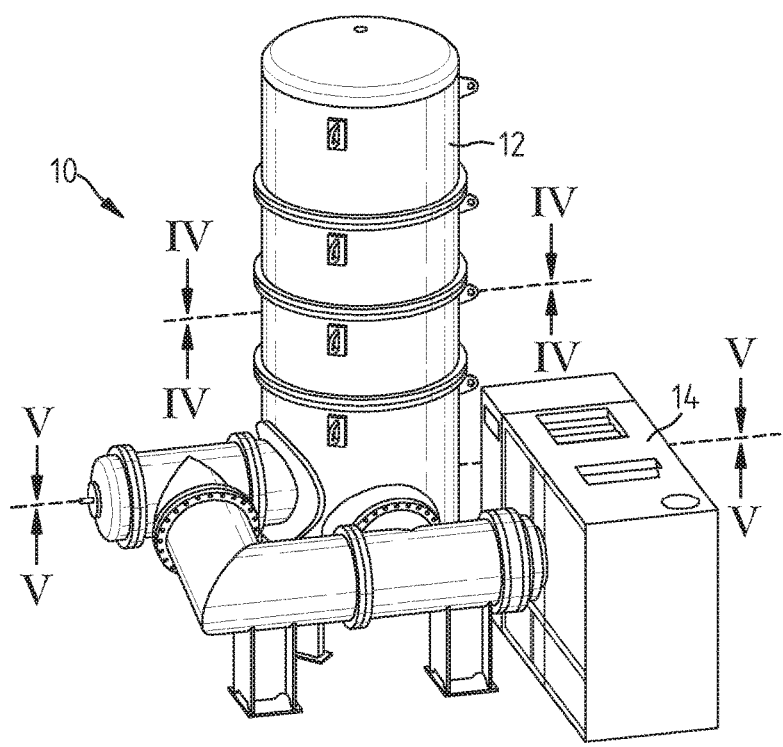
FIG. 2 shows a perspective view of the example energy generation system of FIG. 1.

FIG. 1 shows a block diagram of an example energy generation system 10 including an example apparatus 12 for treating and utilizing the energy of a gaseous medium containing combustible components. FIG. 2 shows a perspective view of the example energy generation system 10 of FIG. 1. In the illustrated example of FIGS. 1 and 2, the energy generation system 10 includes the example apparatus 12 and an example gas turbine unit 14. The apparatus 12 can be used to generate hot gas, for example, by burning lean gas which arises during the production of biogas, or, for example, by burning the exhaust air of a painting system. In the illustrated example, the hot gas is fed into the gas turbine unit 14 in the direction shown by the arrow 16.

In the illustrated example, the gas turbine unit 14 includes an example gas turbine 18, an example compressor 20, an example generator 22, and an example recuperator 26. The gas turbine 18 is coupled to the compressor 20 and drives the generator 22. The gas turbine 18 may be configured as a "micro gas turbine" having the general construction described in WO 2012/089837 A1, the entirety of which is incorporated herein by reference. In the illustrated example, a gaseous medium containing combustible components is fed into the gas turbine unit 14 in the direction shown in FIG. 1 by the arrow 16. The gaseous medium is drawn into the compressor 20 where it is compressed. The gaseous medium is then guided through the recuperator 26 which functions as a heat exchanger and in which heat from the exhaust gas flow of the gas turbine 18, as indicated in FIG. 1 by the arrow 28, is transmitted to the compressed gaseous medium.

In the illustrated example, the apparatus 12 burns the gaseous medium containing combustible components together with rich gas. As used herein, "rich gas" refers to a combustible gas or a gas mixture, the heating value HA of which is above 15 MJ/m3. The heating value of lean gas is substantially less than the heating value of rich gas. As used herein, "lean gas" refers to a combustible gas or a gas mixture, the heating value HS of which is approximately 8.5 MJ/m3. Rich gas burned in the apparatus 12 may be, for example, natural gas, in particular natural biogas.

The example apparatus 12 may be operated for treating a gaseous medium by burning the combustible components of the gaseous medium. The apparatus 12 is suitable for operating both in and outside an energy generation system (e.g., the example energy generation system 10 of FIGS. 1 and 2) for generating electrical and/or mechanical energy. For example, the apparatus 12 may be operated as a two-stage burner in a heat generation system that provides heat for one or more heat consumers.

The example energy generation system 10 may be configured without the recuperator 26. The elimination of the recuperator 26 from the energy generation system 10 may prevent the preheating of the gaseous medium containing combustible components prior to the gaseous medium passing into a combustion chamber of a burner. In instances where the example energy generation system 10 illustrated in FIGS. 1 and 2 is operated without the recuperator 26, an exhaust gas flow is generated which has a comparatively high temperature relative to instances where the energy generation system 10 includes the recuperator 26. Thus, the elimination of the recuperator 26 from the energy generation system 10 may advantageously be used in devices connected downstream of the energy generation system 10, such as, for example, devices for hot water preparation or for drying objects or media.

Figure 3:
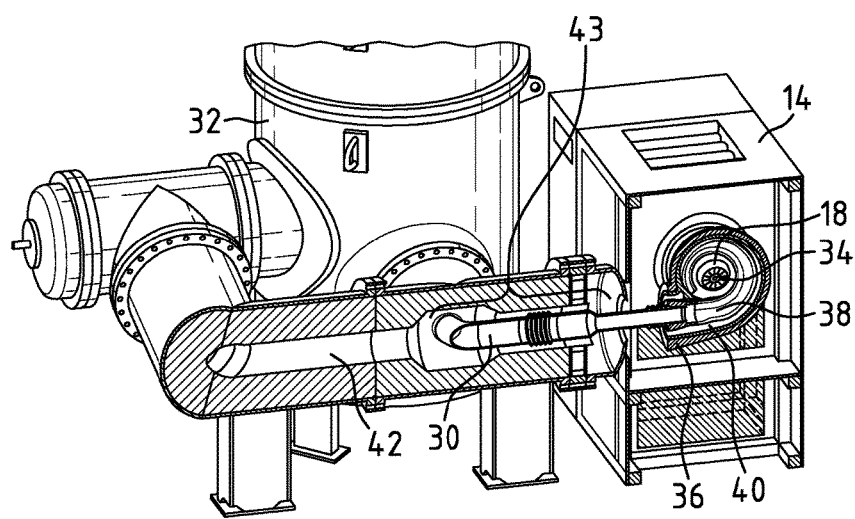
FIG. 3 shows a partial cutaway view of the example energy generation system of FIG. 2.

FIG. 3 shows a partial cutaway view of the example energy generation system 10 of FIG. 2, including the example apparatus 12 and the example gas turbine unit 14. In the illustrated example of FIG. 3, the apparatus 12 includes an example hot gas duct 30. The hot gas duct 30 guides a hot gas flow from an example pressure container 32 of the apparatus 12 to the gas turbine 18 positioned in the gas turbine unit 14. In the illustrated example, the pressure container 32 is configured to have a positive pressure of approximately five bar.

In the illustrated example, the gas turbine unit 14 includes an example turbine housing 36. An example turbine wheel 34 of the gas turbine 18 is rotatably mounted in the turbine housing 36. In the illustrated example, the turbine housing 36 further houses an example turbine duct 38 and an example compressor duct 40. The example compressor 20 described above in relation to FIG. 1 is coupled to the gas turbine 18. The compressor 20 blows gaseous medium charged with combustible components through the compressor duct 40 into an example feed duct 42 of the apparatus 12. In an example portion 43 of the apparatus 12 located upstream of the gas turbine unit 14, the hot gas duct 30 is guided in the feed duct 42. As a result of this arrangement between the hot gas duct 30 and the feed duct 42, the gaseous medium flowing through the feed duct 42 may be preheated with the heat of the gaseous medium from the hot gas duct 30.

Figure 4:
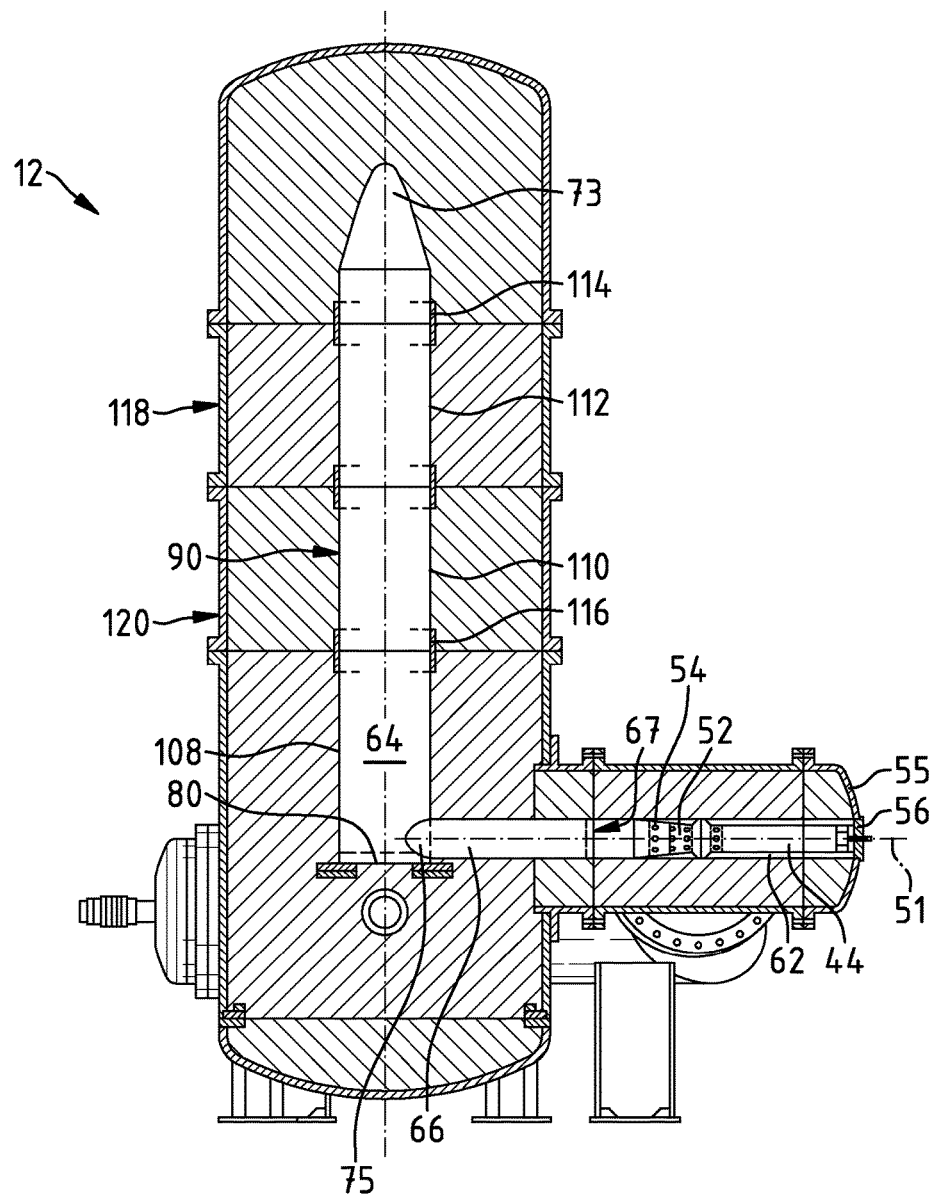
FIG. 4 shows a cross-sectional view of the example apparatus of FIG. 2 including an example reaction chamber, the cross-sectional view being taken along line IV-IV of FIG. 2.
Figure 5:
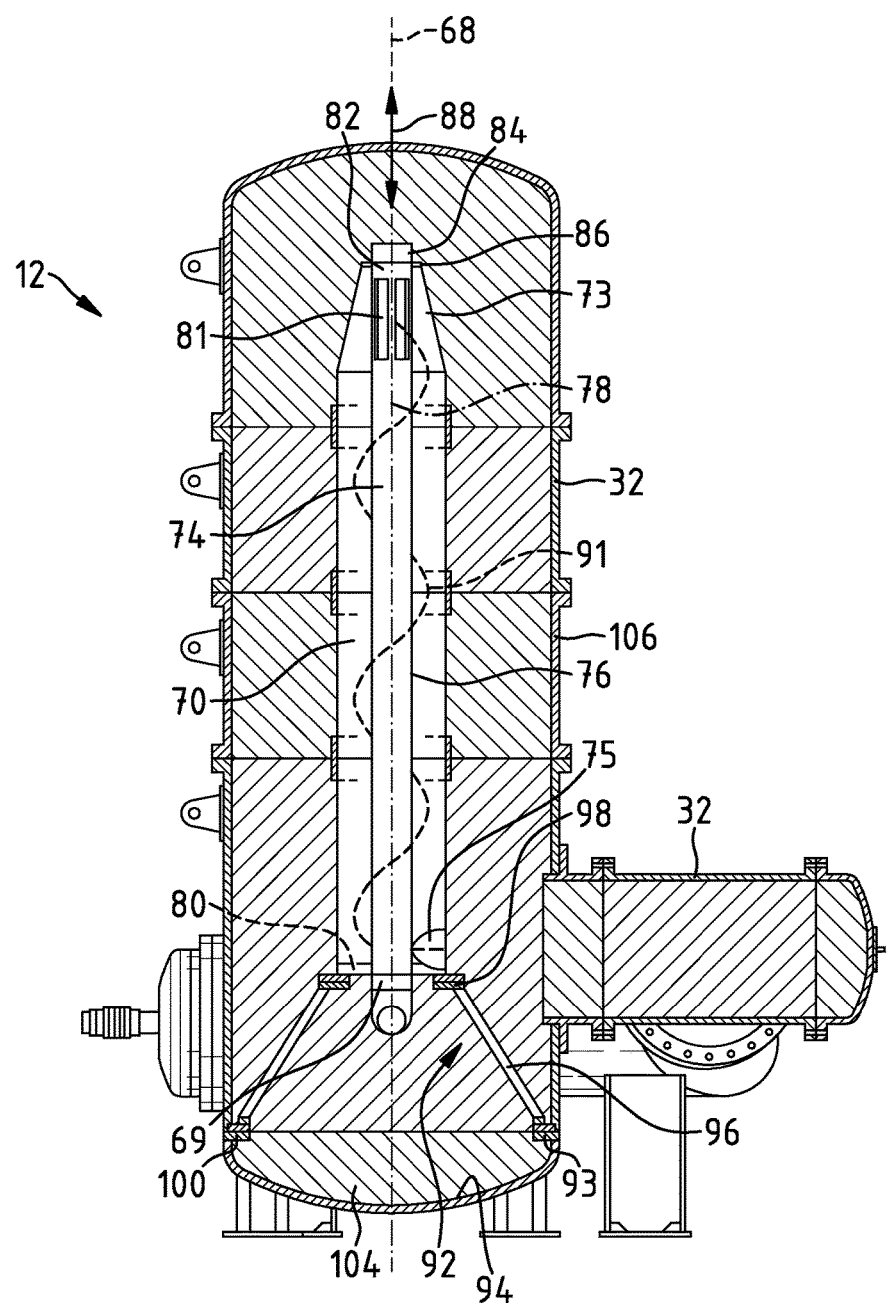
FIG. 5 shows a further cross-sectional view of the example apparatus of FIG. 2 including the example reaction chamber of FIG. 4, the cross-sectional view being taken along line V-V of FIG. 2.

FIG. 4 shows a cross-sectional view of the example apparatus 12 of FIG. 2 taken along line IV-IV of FIG. 2. FIG. 5 shows a further cross-sectional view of the example apparatus 12 of FIG. 2 taken along line V-V of FIG. 2. The cross-sectional view shown in FIG. 5 is laterally offset relative to the cross-sectional view shown in FIG. 4. In the illustrated example of FIGS. 4 and 5, the apparatus 12 includes an example burner 44 having a pilot stage and a main combustion stage. The main combustion stage of the burner 44 includes a combustion chamber positioned in an example flame tube 52 having a plurality of example wall openings 54. The burner 44 is connected to an example torispherical base portion 55 of the pressure container 32 by an example burner flange 56.

In the illustrated example of FIGS. 4 and 5, the burner 44 extends into an example pipe portion 62 of the apparatus 12, the pipe portion 62 being in communication with the feed duct 42 described above in connection with FIG. 3. The flame tube 52 is guided in a linearly movable manner on the wall of the pipe portion 62. The feed duct 42 opens into the interior of the pipe portion 62 at the point where the flame tube 52 of the burner 44 is located. The pipe portion 62 is coupled on the side of the pipe portion 62 facing away from the burner flange 56 to an example reaction chamber 64 having an example inlet opening 67 and an example outlet opening 69 for the gaseous medium. On the side of the flame tube 52 facing the reaction chamber 64, the flame tube 52 of the burner 44 is expanded in a funnel-shaped manner and has a mouth opening for the escape of a gas flow from the feed duct 42, the gas flow being heated by the burner 44 and containing combustible components.

In the illustrated example of FIGS. 4 and 5, the burner 44 is a "two-stage burner". Rich gas is burned in the pilot stage of the burner 44. The burning of the rich gas in the pilot stage produces a gas flame that extends into the main combustion stage of the burner 44, where the gas flowing out of the feed duct 42 into the combustion chamber of the burner 44 is abruptly heated. The combustible components contained therein are reduced with the oxygen contained in the gas, thereby producing additional heat. As a result, a hot gas flow emerges from the mouth opening of the flame tube 52 at a velocity of approximately 20-25 m/s and a temperature of approximately 950° C. and passes from there into the example reaction chamber 64.

In the illustrated example, the air in the apparatus 12 is divided up in the feed duct 42. A first division takes place in the region of the mouth opening of the flame tube 52, where a portion of the air from the feed duct 42 flows directly into the interior of the flame tube 52. The other portion of the air flows on the outer side of the flame tube 52 to the burner 44, where the air is divided up again. The air thus serves as combustion air for the pilot stage of the burner 44 and as combustion air for the main combustion stage of the burner 44. The joint flame resulting from the two-stage burner 44 facilitates the burning of a gaseous medium containing combustible components, for example a lean gas or air which is loaded with solvent and penetrates through the wall openings 54 into the flame tube 52. By air being mixed here at a very high combustion temperature of T>1200° C. with air that is preheated in the example recuperator 26 and enters through the wall openings 54, at a temperature of, for example, T≈650° C., a reaction chamber temperature of, for example, T≈950° C. can arise in the reaction chamber 64. This reaction chamber temperature provides for suitable treatment and/or cleaning of the gaseous medium that is fed into the apparatus 12.

In the illustrated example of FIGS. 4 and 5, the reaction chamber 64 has an example input chamber 66 that extends in the horizontal direction and leads into a portion, extending in the vertical direction 68, of the reaction chamber 64. The reaction chamber includes an example main chamber 70 and an example output chamber 74. The main chamber 70 has an annular area and an example frustoconical roof portion 73. The output chamber 74 is located in an example hollow cylinder 76 having the form of a central pipe that passes through the reaction chamber 64. The hollow cylinder 76 is an example of a "guiding body" as that term is used herein. In the illustrated example, the hollow cylinder 76 has an example hollow cylinder axis 78 that is parallel to the vertical direction 68 and to which the main chamber 70 is preferably rotationally symmetrical.

The gaseous medium that is fed into the apparatus 12 is heated with the burner 44. The heated gaseous medium then flows through the reaction chamber 64 where the gaseous medium is chemically converted. The gaseous medium passes from the reaction chamber 64 into the hot gas duct 30 of the apparatus 12 which feeds the gaseous medium into the gas turbine 18 of the gas turbine unit 14.

In the illustrated example of FIGS. 4 and 5, the main chamber 70 of the reaction chamber 64 is bounded internally by the wall of the guiding body in the form of the hollow cylinder 76. As a result of this arrangement, the heat of the gaseous medium flowing through the main chamber 70 during operation of the apparatus 12 is transmitted through the wall of the hollow cylinder 76 to the gaseous medium flowing through the output chamber 74. The temperature of the gaseous medium in the main chamber 70 and of the gaseous medium in the hollow cylinder 76 may only differ slightly, with the average temperature preferably being T≈950° C.

In the illustrated example of FIGS. 4 and 5, the hollow cylinder 76 passes through the reaction chamber 64. For example, the hollow cylinder 76 extends from a lower end of the reaction chamber 64 formed by an example plate body 80, through the reaction chamber 64 to an upper end of the reaction chamber 64 corresponding to the frustoconical roof portion 73 of the reaction chamber 64. The hollow cylinder 76 is coupled to the plate body 80 which closes off the main chamber 70 of the reaction chamber 64 on the bottom side. The hollow cylinder 76 together with an example wall 90 of the reaction chamber 64 defines the main chamber 70 of the reaction chamber 64. In the frustoconical roof portion 73 of the reaction chamber 64, the wall of the hollow cylinder 76 has example slot-shaped openings 81 which extend in the longitudinal direction of the hollow cylinder 76, and through which the gaseous medium can pass from the main chamber 70 into the output chamber 74 of the reaction chamber 64. In the illustrated example, the main chamber 70 of the reaction chamber 64 is a cylinder-ring-shaped cavity which communicates through the example openings 81 of the hollow cylinder 76 with the interior of the hollow cylinder 76 that defines the output chamber 74.

The gaseous medium admitted through the input chamber 66 into the reaction chamber 64 forms an example cyclone flow 91 that flows with helical flow lines in the reaction chamber 64 around the hollow cylinder 76 and passes through the openings 81 in the hollow cylinder 76 into the output chamber 74 defined by the interior of the hollow cylinder 76. The example openings 81 in the wall of the hollow cylinder 76 may be of any shape that permits the passage of the cyclone flow 91 into the hollow cylinder 76. For example, the openings 81 may be rectangular, circular, elliptical, etc. One or more guiding elements may be provided near the openings 81 for deflecting the flowing gaseous medium so as to reduce pressure losses during the deflection of the flow.

In the illustrated example of FIGS. 4 and 5, an example end portion 82 of the hollow cylinder 76 located opposite the plate body 80 is positioned within an example linear guide 84 having a sleeve-shaped configuration. In some examples, the linear guide 84 may be coupled to an annular end plate 86 of the roof portion 73 of the reaction chamber 64. The end portion 82 of the hollow cylinder 76 may move within the linear guide 84 in the vertical direction 68 as shown in FIG. 5 by the double arrow 88 so as to be able to compensate for thermal expansions associated with differing sizes of the hollow cylinder 76 and/or of the wall 90 of the reaction chamber 64.

In the illustrated example of FIGS. 4 and 5, the input chamber 66 leads into the main chamber 70 of the reaction chamber 64 via an example opening 75 that is laterally offset with respect to the hollow cylinder axis 78 of the hollow cylinder 76. As a result of this arrangement, the gaseous medium that is heated with the burner 44 and fed from the input chamber 66 into the main chamber 70 may be introduced into the main chamber 70 with angular momentum relative to the hollow cylinder axis 78. Such angular momentum results a cyclone flow 91 for the gaseous medium, whereby the gaseous medium is guided around the hollow cylinder 76 in the reaction chamber 64. In the illustrated example, the cyclone flow 91 has a cyclone axis that coincides with the hollow cylinder axis 78.

The input chamber 66 has an example axis 51 which is aligned with the axis of the flame tube 52 of the burner 44. By orienting the axis 51 with respect to the hollow cylinder axis 78, along which the gaseous medium flows out of the input chamber 66 and into the main chamber 70, it is possible to adjust the flow path for the gaseous medium in the main chamber 70 in a defined manner. For example, if the gaseous medium is introduced into the main chamber 70 close to the hollow cylinder axis 78 or obliquely with respect to the hollow cylinder axis 78, the corresponding flow path is shortened. If the gaseous medium is introduced into the main chamber 70 with a large angular momentum with respect to the hollow cylinder axis 78, the flow path is correspondingly extended.

In the frustoconical roof portion 73 of the reaction chamber 64, the cyclone flow 91 is guided by the wall 90 of the reaction chamber 64. The wall 90 is obliquely inclined in the frustoconical roof portion 73 relative to the slot-shaped openings 81 in the hollow cylinder 76. In the illustrated example, the gaseous medium experiences a 180° deflection as it passes from the frustoconical roof portion of the reaction chamber 64 into the main chamber 74 of the hollow cylinder 76.

When the gaseous medium flows through the slot-shaped openings 81 in the hollow cylinder 76, the gaseous medium passes into the output chamber 74 and is converted there into a longitudinal flow that is parallel to the hollow cylinder axis 78. In the output chamber 74, the gaseous medium rapidly loses the angular momentum of the cyclone flow 91. The gaseous medium then moves as a substantially non-spinning hot gas jet through the hot gas duct 30 into the turbine duct 38 of the gas turbine 18, in which there is preferably virtually no vortexes. The dissipation of the angular momentum takes place substantially in the portion of the output chamber 74 nearest the roof portion 73 of the reaction chamber 64 by means of the formation and dissolution of turbulence in the hot gas. As a result, the hot gas leaves the hollow cylinder 76 in the region of the outlet opening 69 substantially without spinning (e.g., substantially without angular momentum). In the illustrated example, the geometry of the reaction chamber 64 suppresses short-circuit flows in the gaseous medium, thus making it possible for the residence period of the gaseous medium that flows through the reaction chamber 64 to be substantially uniform.

In the illustrated example of FIGS. 4 and 5, the annular plate body 80 closing off the bottom side of the reaction chamber 64 acts as a fixed bearing for the hollow cylinder 76 and for the hot gas duct 30. The plate body 80 is supported by means of an example holding device 92 positioned on an example annular step 93 that is coupled to an example torispherical base 94 of the pressure container 32. The holding device 92 holds the plate body 80 and the walls of the main chamber 70 that are accommodated thereon, including the walls of the roof portion 73, as well as the hollow cylinder 76 which is coupled to the plate body 80. The holding device 92 includes example struts 96. The plate body 80 is connected to the struts 96 by means of an example pressure-resistant annular disk 98 made from thermal insulating material. The struts 96 are coupled to an example pressure-resistant annular disk 100 made of thermally insulating material on a step in an inwardly pointing portion of the torispherical base 94 of the pressure container 32 (e.g., on a wall section of the pressure container 32). The interior of the pressure container 32 is filled with an example insulating material 104. In the illustrated example, the struts 96 of the holding device 92 in the pressure container 32 pass through the insulating material 104. A heat flow onto an example wall 106 of the pressure container 32 from the plate body 80 via the holding device 92 is minimized by means of a thin cross-sectional geometry of the struts 96 and the thermally insulating, pressure-resistant annular disks 98, 100. The holding device 92 bears the weight of the walls of the reaction chamber 64 and part of the insulating material 104. The hot gas duct 30 of the apparatus 12 is likewise coupled to the plate body 80.

In the illustrated example of FIGS. 4 and 5, the insulating material 104 in the pressure container 32 is a fiber fabric made from a mineral material. The insulating material 104 in the pressure container 32 provides support for the wall 90 of the reaction chamber 64 and the wall 106 of the pressure container 32. The supporting of the walls of the reaction chamber 64 in the pressure container 32 by means of the holding device 92 and the insulating material 104 ensures that, even at temperatures of above 950° C. in the reaction chamber 64, the temperature of the wall 106 of the pressure container 32 does not exceed a temperature of 60-80° C. In the region of the roof portion 73 of the reaction chamber 64, the insulating material 104 in the pressure container 32 forms a pocket which acts as a sliding seat for the end portion 82 of the hollow cylinder 76.

In the illustrated example of FIGS. 4 and 5, portions of the walls of the reaction chamber 64 in the apparatus 12 are configured as example thin-walled pipe body segments 108, 110, 112 made of steel sheet in the form of metal inner liners which are connected by means of example tubular sleeves 114, 116 made of steel sheet.

Figure 6:
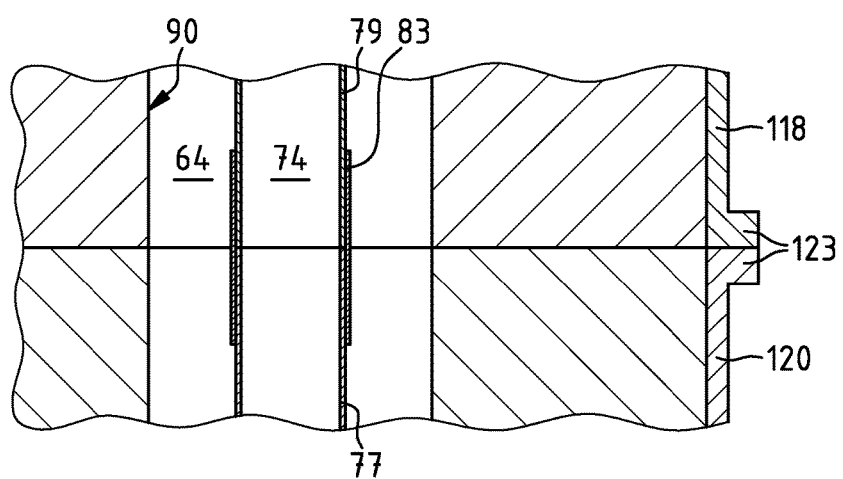
FIG. 6 shows a partial view of the example reaction chamber of FIGS. 4-5.

FIG. 6 shows a partial view of the example reaction chamber 64 of FIGS. 4-5. In the illustrated example of FIG. 6, the pressure container 32 is assembled from a plurality of example cylindrical container segments 118, 120 made of boiler steel. An example connecting flange 123 connects the cylindrical container segments 118, 120. In some examples, the walls of the feed duct 42 and/or the walls of the hot gas duct 30 of the apparatus 12 may be configured as assembled pipe body segments taking the form of metal inner liners made of steel sheet, similar to the pipe body segments 108, 110, 112 described above in relation to the walls of the reaction chamber 64.

The apparatus 12 therefore has a modular construction which makes it possible, by means of a suitable selection of the number of interconnected pipe body segments 108, 110, 112 and container segments 118, 120, to configure the flow path for the gaseous medium into the reaction chamber 64 in such a manner that an advantageous residence period is produced therein for the gaseous medium to be treated. In the illustrated example of FIG. 6, the hollow cylinder 76 acting as the guiding body in the reaction chamber 64 is also constructed from example hollow cylinder segments 77, 79 which are introduced into example tubular sleeves 83 acting as a coupling sleeve. The hollow cylinder segments 77, 79 and the tubular sleeves 83 thereby form a plug-in system.

FIG. 7 shows an alternative embodiment of the example reaction chamber 64 of FIGS. 4-5. FIG. 8 shows a partial cross-sectional view of the example reaction chamber 64 of FIG. 7 taken along line VIII-VIII of FIG. 7. In the illustrated example of FIGS. 7 and 8, the hollow cylinder 76 acting as the guiding body in the reaction chamber 64 is constructed from a plurality of hollow cylinder segments 77, 79 that are fitted one inside the other and coupled together accordingly. The hollow cylinder segments 77, 79 may alternatively be coupled together via a screw or bayonet mechanism. In the illustrated example, the length of one or more of the hollow cylinder segments 77, 79 corresponds to the length of one or more of the container segments 118, 120. By stacking container segments 118, 120 of specific lengths with hollow body segments 77, 79 of corresponding specific lengths, it is possible to adjust the overall length of the flow path for the gaseous medium passing through the reaction chamber 64 in a defined manner.

In the illustrated example of FIGS. 7-8, the hollow cylinder segments 77, 79 are supported against the wall 90 of the reaction chamber 64 by means of example supporting elements 85. The supporting elements 85 are secured on the hollow cylinder segments 77, 79 and arranged to be movable in a linear manner in the reaction chamber 64 in the direction of the double arrow 87 to avoid mechanical stresses during a thermal expansion of the hollow cylinder segments 77, 79. The supporting elements 85 may alternatively be secured to the wall 90 of the reaction chamber 64 such that the supporting elements 85 are movable in a linear manner relative to the hollow cylindrical segments 77, 79 in the direction of the double arrow 87.

As an alternative to the supporting elements 85 shown in the illustrated example of FIGS. 7 and 8, the hollow cylinder segments 77, 79 of the hollow cylinder 76 acting as a guide body may instead be supported on the wall 90 of the reaction chamber 64 by means of stiffening structures which are connected to the hollow cylinder 76 or are integrated into the hollow cylinder 76. Such stiffening structures may be configured, for example, as ribs or as bars.

Figure 9:
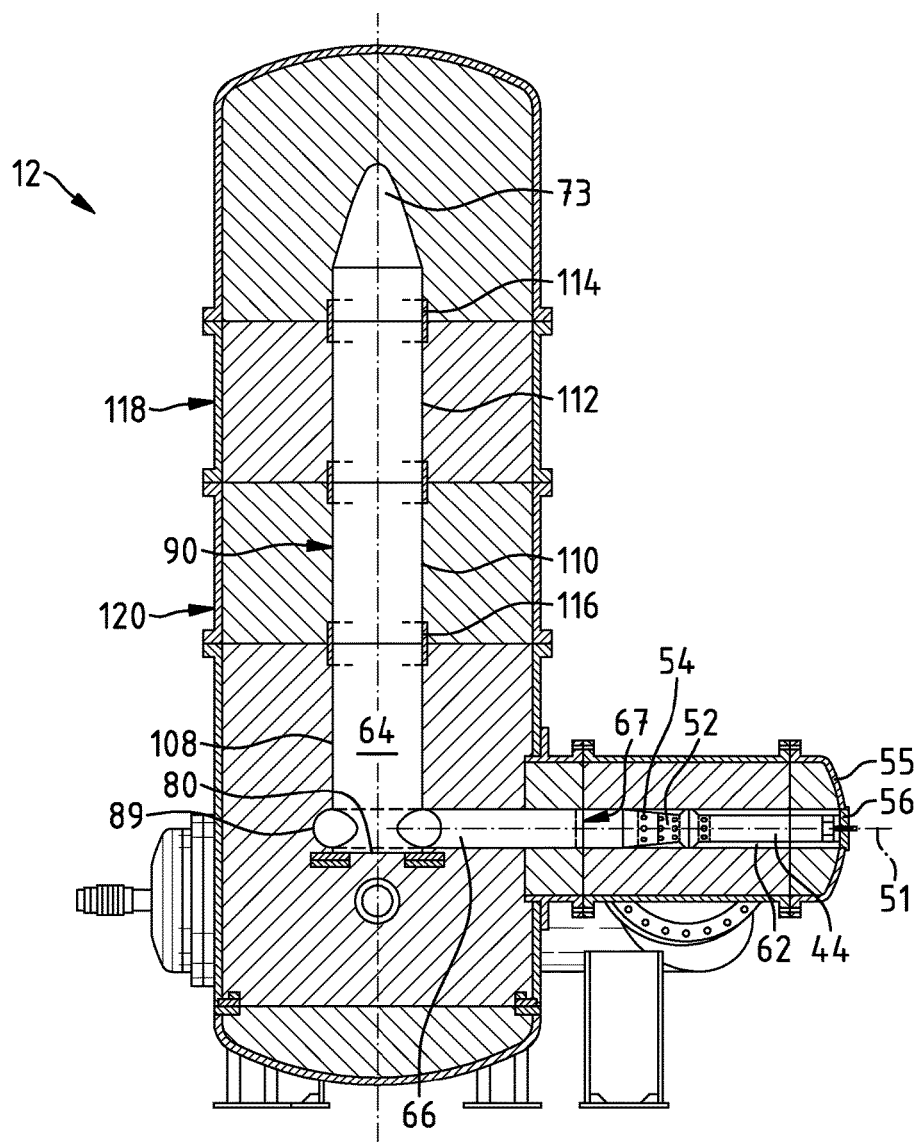
FIGS. 9 and 10 show a further alternative embodiment of the example reaction chamber of FIGS. 4-5.
Figure 10:
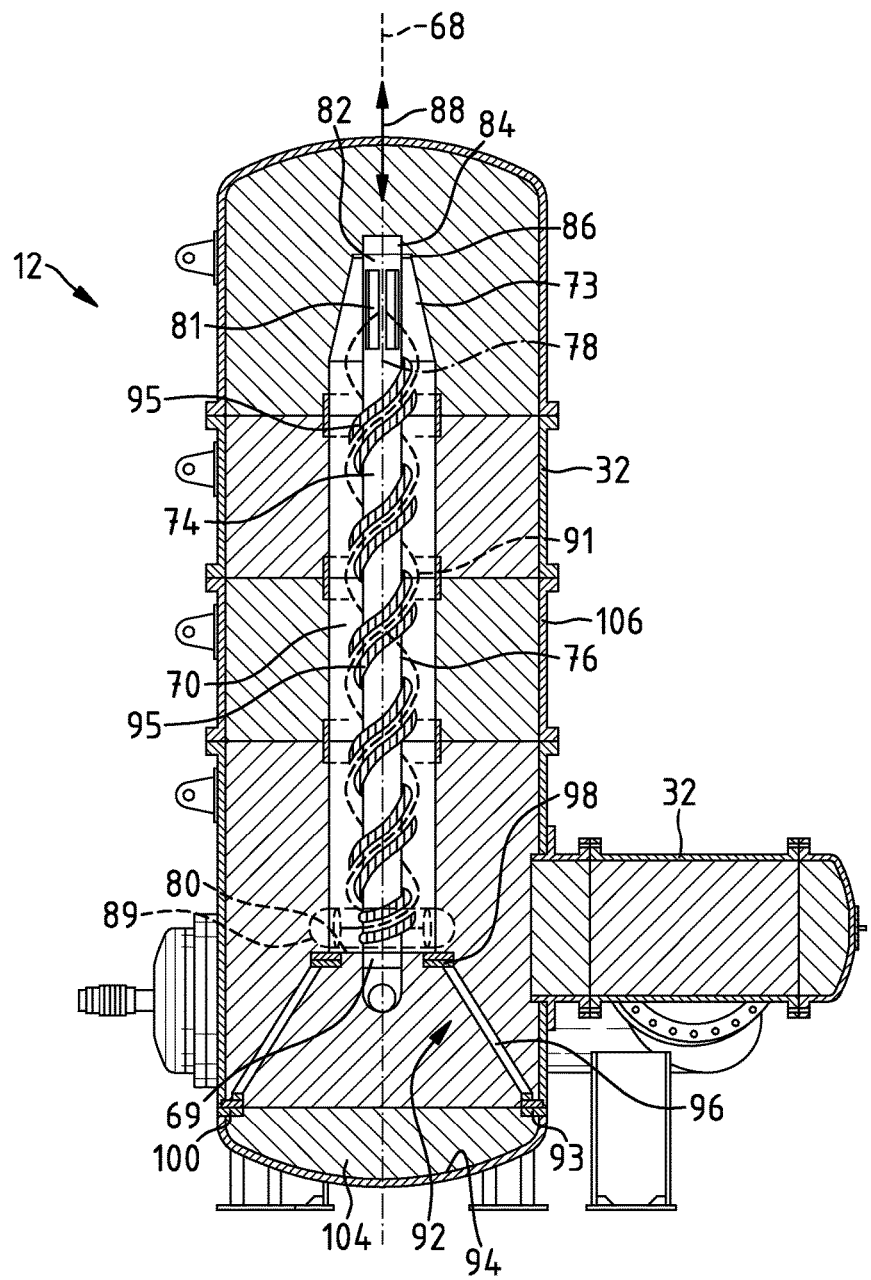

FIGS. 9 and 10 show a further alternative embodiment of the example reaction chamber 64 of FIGS. 4-5. In the illustrated example of FIGS. 9 and 10, the gaseous medium is admitted into the reaction chamber 64 via an example annular duct 89 that surrounds the bottom side of the reaction chamber 64. The annular duct 89 includes a plurality of nozzles that are offset azimuthally in the annular duct 89 in such a manner that the gaseous medium is introduced into the reaction chamber 64 with angular momentum relative to the hollow cylinder axis 78 of the hollow cylinder 76 of the reaction chamber 64.

In the illustrated example of FIGS. 9 and 10, the annular duct 89 functions as a distribution duct that connects the input chamber 66 of the reaction chamber 64 to the main chamber 70 of the reaction chamber 64. The annular duct 89 may be formed with only one passage opening or with a plurality of passage openings for the gaseous medium.

In the illustrated example of FIGS. 9 and 10, the hollow cylinder 76 acting as the guiding body in the reaction chamber 64 is provided with example helical guiding elements 95 that guide the gaseous medium flowing through the reaction chamber 64. The helical guiding elements 95 form a guide spiral and reduce the scatter of the average residence period of the gaseous medium flowing in the reaction chamber 64. The helical guiding elements 95 may be configured so as to act as a guide spiral with one, two, three or more turns. In the illustrated example, the injection direction of the nozzles through which the gaseous medium flows out of the annular duct 89 and into the main chamber 70 of the reaction chamber 64 is adapted to the helical pitch of the guiding elements 95.

Figure 11:
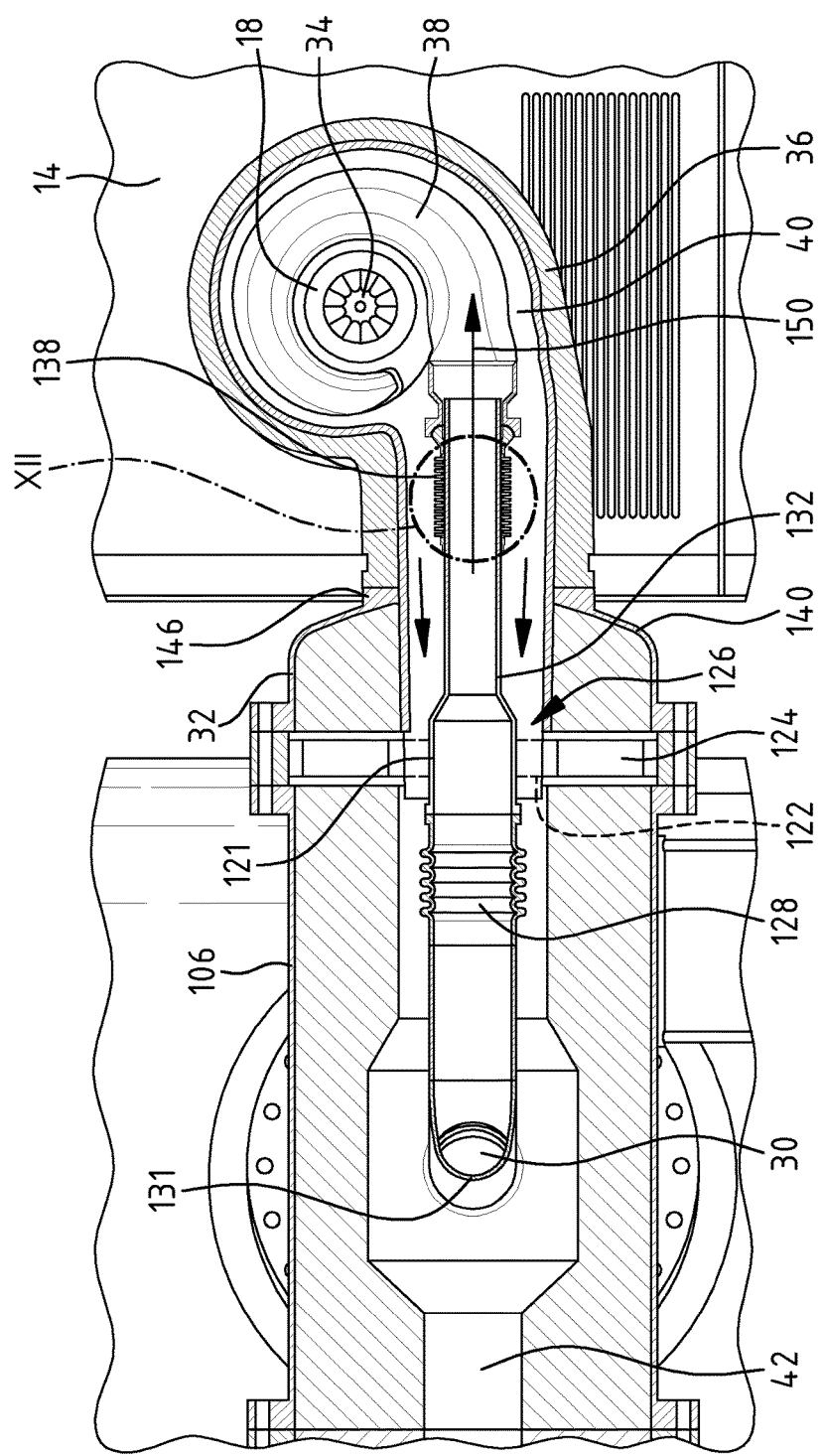
FIG. 11 shows a further partial cutaway view of the example energy generation system of FIGS. 2-3.

FIG. 11 shows a further partial cutaway view of the example energy generation system 10 of FIGS. 2-3. In the illustrated example of FIG. 11, the hot gas duct 30 and the feed duct 42 are respectively coupled to the turbine duct 38 and the compressor duct 40 located within the turbine housing 36 of the gas turbine 18. The hot gas duct 30 has an example pipe wall 121 that is supported on an example annular disk 124 by means of an example holding ring 122. In the illustrated example, the annular disk 124 is coupled to the wall 106 of the pressure container 32. The holding ring 122 therefore acts as an example fixed bearing 126 for the pipe of the hot gas duct 30. At an example pipe bend 131 of the hot gas duct 30, a metal strut acts as a fixed bearing for the hot gas duct 30 and couples the hot gas duct 30 to the wall of the pressure container 32. At a location between the fixed bearing that couples the hot gas duct 30 to the wall of the pressure container 32 and the fixed bearing 126, the pipe wall 121 of the hot gas duct 30 has an example compensator 128 that is configured as a flexible bellows to compensate for thermal expansions of the pipe walls in the longitudinal direction 150. The compensator 128 is clamped between the fixed bearing brought about by means of the metal strut and the fixed bearing 126. In some examples, an additional compensator (not shown) may be provided on the hot gas duct 30 between the fixed bearing brought about by means of the metal strut and the plate body 80 to absorb the elongation in length of the hot gas duct 30 between those respective locations.

In the illustrated example of FIG. 11, the pipe wall 121 of the hot gas duct 30 has an example gas turbine unit connecting section 132 that is held in the fixed bearing 126 on the wall 106 of the pressure container 32 and leads into the turbine duct 38 of the gas turbine 18. An additional compensator 138 is positioned on the gas turbine unit connecting section 132 of the hot gas duct 30 to compensate for thermal expansions occurring near that location. The compensator 138 is configured as a flexible bellows that compensates for the thermal linear expansion of the walls of the hot gas duct 30 when hot gas, the temperature T of which lies within a range of T=950° C. or higher, is guided through the hot gas duct 30.

In the illustrated example of FIG. 11, the gas turbine unit connecting section 132 projects out of the pressure container 32 of the apparatus 12 and is introduced into the gas turbine unit 14. The outside diameter of the gas turbine unit connecting section 132 is configured such that the gas turbine unit connecting section 132 may be introduced into the turbine duct 38 with little play. In the illustrated example of FIG. 11, the pressure container 32 is rigidly coupled to the turbine housing 36 by means of an example flange 146 formed on an example torispherical base 140 of the pressure container 32.

Figure 12:
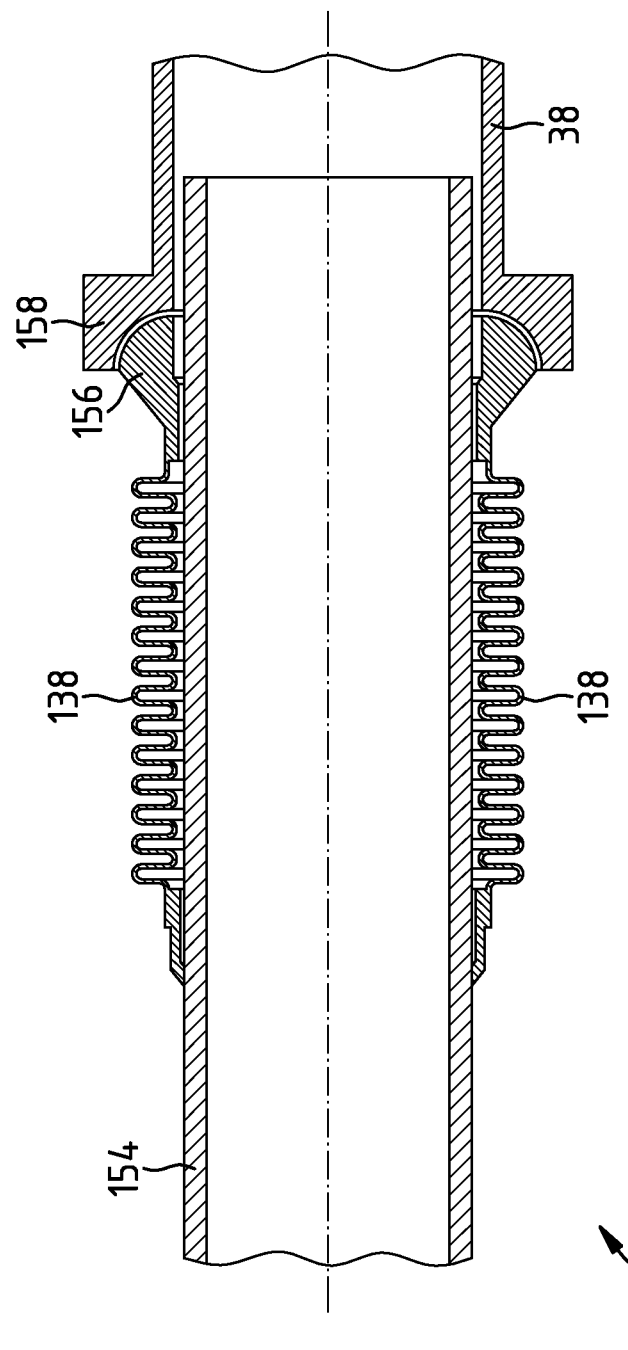
FIG. 12 shows a partial view of an example gas turbine unit connecting section of the example energy generation system of FIGS. 2-3 and 11.

FIG. 12 shows a partial view of the example gas turbine unit connecting section 132 of FIG. 11. In the illustrated example of FIG. 12, the gas turbine unit connecting section 132 includes an example pipe body 154 projecting into the turbine duct 38 and further includes the example compensator 138 that is pushed over and coupled to the pipe body 154.

In the illustrated example of FIG. 12, the compensator 138 is pushed over the pipe body 154 and welded to the pipe body 154 on the side of the pipe body 154 that faces the reaction chamber 64. An end portion of the compensator 138 positioned nearest the gas turbine 18 has an example convex molded section 156 that engages in a form-fitting manner with an example connecting portion 158 of the turbine duct 38, the connecting portion 158 having a concave recess. The compensator 138 is thus connected to the turbine duct 38 with a sealing action.

Upon being heated, the pipe body 154 may thermally expand into the turbine duct 38. The thermal expansion of the pipe body 154 is compensated for by deformation of the bellows of the compensator 138. As a result, in the different operating states of the apparatus 12, the hot gas duct 30 remains coupled to the turbine duct 38 in a gas-tight manner without excessive mechanical stresses that could impair an interference-free operation of the gas turbine 18. For this purpose, the compensator 138 is preferably dimensioned in such a manner that the force introduced into the turbine housing 36 by the thermal expansion of the gas turbine unit connecting section 132 is minimal and, for example, at a temperature of T≈950° C., is not more than 120 N.

The example apparatus 12 described above provides for a gaseous medium containing combustible components to be efficiently and effectively treated, and/or for the energy thereof to be utilized, the gaseous medium accumulating in the form of lean gas, for example during the production of biogas, or being the exhaust air of a painting system.

An example method for treating and/or utilizing a gaseous medium containing combustible components may include at least the following steps:

a. feeding a gaseous medium containing combustible components via a feed duct to a burner having a heatable combustion chamber;
b. converting the gaseous medium containing combustible components in the burner to form an exhaust gas containing residues of the gaseous medium;
c. feeding the exhaust gas from the burner into the reaction chamber in the form of an exhaust gas flow;
d. guiding the exhaust gas flow through the reaction chamber; and
e. converting the exhaust gas within the residence period in the reaction chamber to form a treated exhaust gas, wherein the dispersion of the residence period of exhaust gas in the reaction chamber is less than 50%, in particular less than 30%, preferably less than 20%, particularly preferably less than 10%.

Guiding the exhaust gas flow in step d. of the example method described above refers to a deviation, deflection, focusing and/or canalization of the exhaust gas flow in the reaction chamber by means of at least one guiding body. Converting the exhaust gas flow in step e. of the example method described above preferably takes place during the guiding of the exhaust gas flow in the reaction chamber.

In some disclosed examples, an apparatus provides for the efficient and effective chemical conversion of combustible components of a gaseous medium by guiding the flow of the gaseous medium within a reaction chamber of the apparatus. In some disclosed examples, the apparatus for treating and/or utilizing the energy of a gaseous medium containing combustible components includes a burner having a heatable combustion chamber. In some disclosed examples, the apparatus includes a feed duct for feeding the gaseous medium into the combustion chamber. In some disclosed examples, the apparatus includes a reaction chamber through which the gaseous medium can flow. In some disclosed examples, the reaction chamber includes an inlet opening through which the gaseous medium flows into the reaction chamber 64 and an outlet opening through which the gaseous medium passes out of the reaction chamber into a hot gas duct for discharging treated exhaust gas from the reaction chamber. In some disclosed examples, a guiding body for guiding the flow of the gaseous medium is positioned within the reaction chamber. In some disclosed examples, the guiding body is a hollow cylinder.

In some disclosed examples, the guiding body is configured to stabilize a residence period of the gaseous medium in the reaction chamber. In some disclosed examples, the guiding body results in a flow path of the gaseous medium within the reaction chamber being optimized and/or maximized, and/or results in a short circuit flow of the gaseous medium in the reaction chamber being suppressed. In some disclosed examples, an adaptation of an increase in a cyclone flow of the gaseous medium can be influenced in the sense of maximizing the flow path.

In some disclosed examples, the guiding body is arranged in a portion of the reaction chamber that extends in a longitudinal direction. In some disclosed examples, the gaseous medium is guided around the guiding body via a cyclone flow having a cyclone axis extending in the longitudinal direction. In some disclosed examples, the guiding body extends from one end of the reaction chamber to the other end of the reaction chamber. In some disclosed examples, the guiding body extends through the reaction chamber. In some disclosed examples, the guiding body includes at least one helical guiding element to guide the gaseous medium around the guiding body in the portion of the reaction chamber extending in the longitudinal direction.

In some disclosed examples, the gaseous medium being guided through the reaction chamber maintains a flow path length, the flow path length being greater than the length of the reaction chamber extending in the longitudinal direction.

In some disclosed examples, the guiding body is configured as a hollow cylinder that extends in the longitudinal direction of the reaction chamber and has at least one wall opening that facilitates the passage of the gaseous medium from the reaction chamber into the hot gas duct. In some disclosed examples, the guiding body is configured to form, together with an outer wall of the reaction chamber, a cylinder-ring-shaped cavity that forms a main chamber of the reaction chamber and that communicates with the interior of the hollow cylinder through the wall opening in the hollow cylinder. In some disclosed examples, the hollow cylinder has a cylinder axis that coincides with the cyclone axis extending in the longitudinal direction.

In some disclosed examples, the hollow cylinder advantageously converts the cyclone flow of the gaseous medium in its interior into a non-spinning or virtually non-spinning longitudinal flow. In some disclosed examples, the inside diameter of the hollow cylinder is significantly smaller than the diameter of the reaction chamber through which the hollow cylinder passes. In some disclosed examples, the hollow cylinder forms an output chamber of the reaction chamber in which the gaseous medium that emerges from the main chamber rapidly loses the angular momentum associated with the cyclone flow. In some disclosed examples, the gaseous medium that is treated in the reaction chamber is in the form of a non-spinning hot gas flow that is fed from the output chamber of the reaction chamber to a gas turbine unit in which the energy of a non-spinning hot gas flow can be efficiently utilized.

In some disclosed examples, the portion of the reaction chamber that extends in the longitudinal direction is closed off on one side by a plate body that accommodates the guiding body on a fixed bearing. In some disclosed examples, the guiding body is guided in an axially movable manner in the longitudinal direction. In some disclosed examples, the guiding body is guided in an axially or linearly movable manner at an end portion facing away from the plate body. In some disclosed examples, the guiding body is advantageously configured to avoid mechanical stresses resulting from differing thermal linear expansion of the walls of the reaction chamber. In some disclosed examples, the pipe of the hot gas duct is coupled to the plate body so as to ensure a stable seat.

In some disclosed examples, the reaction chamber includes an input chamber that connects the combustion chamber to a portion of the reaction chamber that extends in the longitudinal direction. In some disclosed examples, the input chamber leads into the main chamber of the reaction chamber via an opening that is laterally offset with respect to the hollow cylinder axis of the hollow cylinder. In some disclosed examples, the gaseous medium that is heated with the burner and fed from the input chamber into the main chamber is introduced into the main chamber with an angular momentum with respect to the hollow cylinder axis of the hollow cylinder. In some disclosed examples, the angular momentum advantageously provides a cyclone flow for the gaseous medium in the reaction chamber that is guided around the hollow cylinder and has a cyclone axis coinciding with the hollow cylinder axis.

In some disclosed examples, the input chamber has an axis that is aligned with the axis of the flame tube of the burner. In some disclosed examples, by orienting the axis of the input chamber with respect to the hollow cylinder axis, along which the gaseous medium flows out of the input chamber and into the main chamber, the flow path for the gaseous medium in the main chamber may advantageously be adjusted in a defined manner. In some disclosed examples, if the gaseous medium is introduced into the main chamber close to the hollow cylinder axis or obliquely with respect to the hollow cylinder axis, the corresponding flow path is shortened. In some disclosed examples, if the gaseous medium is introduced into the main chamber with a large angular momentum with respect to the hollow cylinder axis, the flow path is correspondingly extended In some disclosed examples, the hot gas duct, the feed duct and the reaction chamber are positioned in a pressure container that is filled with insulating material and surrounds the reaction chamber. In some disclosed examples, the reaction chamber has a wall that is at least partially composed of interconnected pipe body segments that are plugged together. In some disclosed examples, the wall of the reaction chamber is gas-permeable and is formed from a thin steel sheet, for example metal inner liner. In some disclosed examples, the wall of the reaction chamber does not have to withstand any large compressive forces because the positive pressure in the reaction chamber can be absorbed by the pressure container.

In some disclosed examples, the wall of the reaction chamber is coupled to a plate body of the pressure container that acts as a fixed bearing for the guiding body. In some disclosed examples, the plate body is coupled to a holding device that connects the plate body to at least one supporting element that passes through the insulating material. In some disclosed examples, the supporting element has high heat conduction resistance to a wall section of the pressure container. In some disclosed examples, the heat flow from the feed duct, the hot duct and the reaction chamber is kept low.

In some disclosed examples, the pressure container is assembled from a plurality of container segments. In some disclosed examples, the container segments provide for a modular configuration of the apparatus that allows for an increase or decrease in the volume of the reaction chamber. In some disclosed examples, an increase or decrease in the volume of the reaction chamber adjusts the residence period or the length of the flow path for the gaseous medium in the reaction chamber to be treated in the apparatus.

In some disclosed examples, the combustion chamber of the burner is located in a flame tube that has a mouth opening facing the reaction chamber. In some disclosed examples, the flame tube is advantageously positioned in a pipe section communicating with the feed duct, and has a plurality of wall openings through which the gaseous medium can pass from the feed duct into the combustion chamber.

In some disclosed examples, the hot gas duct has a duct portion that is thermally coupled to the feed duct for feeding the gaseous medium into the reaction chamber. In some disclosed examples, the duct portion of the hot gas duct that is thermally coupled to the feed duct permits the transmission of heat so as to preheat the gaseous medium that is fed to the apparatus. In some disclosed examples, the hot gas duct includes a pipe with a compensator that compensates for thermal linear expansions. In some disclosed examples, the hot gas duct is coupled to the apparatus at two spaced-apart fixed bearings. In some disclosed examples, the compensator is located between the two spaced-apart fixed bearings.

In some disclosed examples, an energy generation system that includes the apparatus for treating and/or utilizing the energy of the gaseous medium containing combustible components further includes a gas turbine unit connected to the hot gas duct of the apparatus. In some disclosed examples, the gas turbine unit includes a gas turbine that is coupled to a compressor. In some disclosed examples, the compressor compresses the gaseous medium that is supplied to the apparatus.

In some disclosed examples, the energy generation system includes an apparatus for treating and/or utilizing the energy of a gaseous medium containing combustible components. In some disclosed examples, the energy generation system includes a gas turbine unit that is connected to a hot gas duct of the apparatus. In some disclosed examples, the gas turbine unit includes a turbine duct. In some disclosed examples, the energy generation system includes a burner that has a heatable combustion chamber. In some disclosed examples, the energy generation system includes a feed duct for feeding the gaseous medium into the combustion chamber. In some disclosed examples, the energy generation system includes a reaction chamber through which the gaseous medium can flow and which has an inlet opening through which the gaseous medium flows into the reaction chamber and an outlet opening through which the gaseous medium passes out of the reaction chamber into the hot gas duct for discharging treated exhaust gas from the reaction chamber.

In some disclosed examples, the hot gas duct includes a pipe having a gas turbine unit connecting section. In some disclosed examples, the pipe of the gas turbine unit connecting section is coupled to the apparatus via a fixed bearing. In some disclosed examples, the pipe of the gas turbine unit connecting section includes a pipe body that projects into the turbine duct and on which a compensator surrounding a portion of the pipe body is secured. In some disclosed examples, the compensator has a molded section that, for the gas-tight connection of the hot gas duct and the turbine duct, is connected in a form-fitting manner to a mating molded section formed on the turbine duct. In some disclosed examples, the gas turbine unit connecting section includes a compensator that is arranged between the fixed bearing and the mating molded portion. In some disclosed examples, the compensator at least partially compensates for a change in length of the gas turbine unit connecting section caused by heating.

In some disclosed examples, the apparatus for treating and/or utilizing the energy of a gaseous medium containing combustible components may be used for treating and/or thermally utilizing a gaseous medium having volatile organic components (VOC). A gaseous medium having volatile, hydrocarbon-containing components may be released, for example, in the cleaning of barrels, in wood processing, in the production of carbon fiber materials, in adhesive bonding processes, etc. In some disclosed examples, the apparatus may be used for treating and/or thermally utilizing the exhaust air of a painting system or for treating and/or thermally utilizing what is referred to as lean gas that accumulates during the production of biogas, that accumulates as methane, that is released during the processing of fossil fuels, or which arises on landfills. In some disclosed examples, the apparatus may be operated with solvent-laden exhaust air of painting systems or with exhaust air containing combustible components from chemical production plants, such as production plants in the drug industry or in the petrochemical industry. In some disclosed examples, the apparatus may be fed with exhaust air that contains combustible components accumulated in the production of semiconductors and/or composite materials, or in the production and coating of carbon fibers.

It is noted that this patent arises from a continuation-in-part of International Patent Application No. PCT/EP2014/053630, which was filed on Feb. 25, 2014, which claims priority to German Patent Application No. 10 2013 203 448.2, which was filed on Feb. 28, 2013. The foregoing International Patent Application and German Patent Application are hereby incorporated herein by reference in their entireties.

Although certain example systems, apparatus and methods have been disclosed herein, the scope of coverage of this patent is not limited thereto. On the contrary, this patent covers all systems, apparatus and methods fairly falling within the scope of the claims of this patent.

What is claimed is:

1. A method for using an apparatus to treat or utilize energy of a gaseous medium containing combustible components, the method comprising:
   providing the apparatus, the apparatus comprising:
      a pressure container;
      a burner including a heatable combustion chamber, the burner being arranged in a first portion of the pressure container, the first portion of the pressure container having a first longitudinal axis;
      a feed duct for feeding the gaseous medium into the heatable combustion chamber;
      a reaction chamber through which the gaseous medium can flow, the reaction chamber being arranged in a second portion of the pressure container, the second portion of the pressure container having a second longitudinal axis, the first longitudinal axis being transverse to the second longitudinal axis, the reaction chamber including an input chamber, a main chamber, and an output chamber, the input chamber being in fluid communication with the heatable combustion chamber, the main chamber being in fluid communication with the input chamber, the output chamber being in fluid communication with the main chamber and further being in fluid communication with a hot gas duct, thereby providing a flowpath for the gaseous medium from the heatable combustion chamber through the input chamber, through the main chamber, through the output chamber, and into the hot gas duct, the main chamber having an inlet opening for receiving the gaseous medium from the input chamber, the output chamber having an outlet opening for discharging the gaseous medium into the hot gas duct; and
      a hollow cylinder for guiding the gaseous medium in the main chamber of the reaction chamber, the hollow cylinder having an axis and extending through the main chamber in a longitudinal direction, the hollow cylinder including a radially outer surface, with respect to the axis of the hollow cylinder, and a radial inner surface, with respect to the axis of the hollow cylinder, and at least one wall opening extending through the radially outer surface and the radially inner surface, such that the gaseous medium can flow through the at least one wall opening, the at least one wall opening fluidly connecting the main chamber and the output chamber, the inlet opening of the main chamber being laterally offset relative to the axis of the hollow cylinder to provide angular momentum to the gaseous medium relative to the axis of the hollow cylinder as the gaseous medium flows from the input chamber into the main chamber, the inlet opening configured to cause the gaseous medium to flow in a cyclone flow about, and in contact with, the radially outer surface of the hollow cylinder within the main chamber, the cyclone flow having a cyclone axis extending in the longitudinal direction;

the method further comprising:
   feeding the gaseous medium, via the feed duct, to the burner;
   converting the gaseous medium in the heatable combustion chamber of the burner to form an exhaust gas;
   feeding the exhaust gas from the burner into the reaction chamber;
   guiding the exhaust gas through the reaction chamber, and
   converting the exhaust gas in the reaction chamber, within a residence period of the exhaust gas in the reaction chamber, to form a treated exhaust gas;
   wherein a dispersion of the residence period of the exhaust gas in the reaction chamber is less than 50%.

2. The method as defined in claim 1, further comprising compressing the gaseous medium in a compressor prior to feeding the gaseous medium to the burner.

3. The method as defined in claim 1, further comprising heating the gaseous medium in a recuperator prior to feeding the gaseous medium to the burner.

4. The method as defined in claim 1, further comprising expanding the treated exhaust gas in a turbine, and driving a generator and a compressor with the turbine.

5. The method as defined in claim 1, wherein the second longitudinal axis is laterally offset from the first longitudinal axis.

6. An apparatus for treating or utilizing energy of a gaseous medium containing combustible components, the apparatus comprising:
   a pressure container;
   a burner including a heatable combustion chamber, the burner being arranged in a first portion of the pressure container, the first portion of the pressure container having a first longitudinal axis;
   a feed duct for feeding the gaseous medium into the heatable combustion chamber;
   a reaction chamber through which the gaseous medium can flow, the reaction chamber being arranged in a second portion of the pressure container, the second portion of the pressure container having a second longitudinal axis, the first longitudinal axis being transverse to the second longitudinal axis, the reaction chamber including an input chamber, a main chamber, and an output chamber, the input chamber being in fluid communication with the heatable combustion chamber, the main chamber being in fluid communication with the input chamber, the output chamber being in fluid communication with the main chamber and further being in fluid communication with a hot gas duct, thereby providing a flowpath for the gaseous medium from the heatable combustion chamber through the input chamber, through the main chamber, through the output chamber, and into the hot gas duct, the main chamber having an inlet opening for receiving the gaseous medium from the input chamber, the output chamber having an outlet opening for discharging the gaseous medium into the hot gas duct; and a hollow cylinder for guiding the gaseous medium in the main chamber of the reaction chamber, the hollow cylinder having an axis and extending through the main chamber in a longitudinal direction, the hollow cylinder including a radially outer surface, with respect to the axis of the hollow cylinder, and a radially inner surface, with respect to the axis of the hollow cylinder, and at least one wall opening extending from the radially outer surface to the radially inner surface, such that the gaseous medium can flow through the at least one wall opening, the at least one wall opening fluidly connecting the main chamber and the output chamber, the inlet opening of the main chamber being laterally offset relative to the axis of the hollow cylinder to provide angular momentum to the gaseous medium relative to the axis of the hollow cylinder as the gaseous medium flows from the input chamber into the main chamber, the inlet opening configured to cause the gaseous medium to flow in a cyclone flow about, and in contact with, the radially outer surface of the hollow cylinder within the main chamber, the cyclone flow having a cyclone axis extending in the longitudinal direction.

7. The apparatus as defined in claim 6, wherein the hollow cylinder includes at least one helical guiding element for guiding the gaseous medium about the radially outer surface of the hollow cylinder in the main chamber of the reaction chamber.

8. The apparatus as defined in claim 6, wherein the cyclone flow of the gaseous medium is converted into a longitudinal flow within the hollow cylinder.

9. The apparatus as defined in claim 6, wherein a plate body closes off a side of the main chamber of the reaction chamber, the plate body accommodating the hollow cylinder on a fixed bearing.

10. The apparatus as defined in claim 9, wherein an end portion of the hollow cylinder facing away from the plate body is axially unrestrained along the longitudinal direction to accommodate thermal expansion of the hollow cylinder.

11. The apparatus as defined in claim 9, wherein the hot gas duct includes a pipe body coupled to the plate body.

12. The apparatus as defined in claim 6, wherein the main chamber of the reaction chamber extends in the longitudinal direction.

13. The apparatus as defined in claim 6, wherein the pressure container is filled with insulating material, the insulating material surrounding at least the reaction chamber.

14. The apparatus as defined in claim 13, wherein the reaction chamber includes a wall having a plurality of interconnected pipe body segments.

15. The apparatus as defined in claim 14, wherein the plurality of interconnected pipe body segments are configured as thin-walled pipe body segments and are connected by tubular sleeves.

16. The apparatus as defined in claim 14, wherein a side of the wall of the reaction chamber is coupled to a plate body, the plate body being a fixed bearing for the hollow cylinder.

17. The apparatus as defined in claim 16, wherein the plate body is accommodated on a holding device, the holding device connecting the plate body to a wall section of the pressure container via one or more supporting elements passing through the insulating material.

18. The apparatus as defined in claim 13, wherein the pressure container includes a plurality of container segments.

19. The apparatus as defined in claim 6, wherein the heatable combustion chamber of the burner is formed in a flame tube having a mouth opening facing the reaction chamber.

20. The apparatus as defined in claim 19, wherein the flame tube is arranged in a pipe section porton in fluid communication with the feed duct, the flame tube having a plurality of wall openings through which the gaseous medium can pass from the feed duct into the heatable combustion chamber of the burner.

21. The apparatus as defined in claim 1, wherein a portion of the hot gas duct is thermally coupled to the feed duct.

22. The apparatus as defined in claim 1, wherein the hot gas duct includes a pipe having a compensator for compensating for linear thermal expansions.

23. The apparatus as defined in claim 1, wherein the apparatus is coupled to a gas turbine unit via the hot gas duct of the apparatus.

24. The apparatus as defined in claim 6, wherein the second longitudinal axis is laterally offset from the first longitudinal axis.

25. An energy generation system comprising:
    an apparatus for treating or utilizing energy of a gaseous medium containing combustible components, the apparatus including:
        a pressure container;
        a burner including a heatable combustion chamber, the burner being arranged in a first portion of the pressure container, the first portion of the pressure container having a first longitudinal axis;
        a feed duct for feeding the gaseous medium into the combustion chamber;
        a reaction chamber through which the gaseous medium can flow, the reaction chamber being arranged in a second portion of the pressure container, the second portion of the pressure container having a second longitudinal axis, the first longitudinal axis being transverse to the second longitudinal axis, the reaction chamber including an input chamber, a main chamber, and an output chamber, the input chamber being in fluid communication with the heatable combustion chamber, the main chamber being in fluid communication with the input chamber, the output chamber being in fluid communication with the main chamber and further being in fluid communication with a hot gas duct, thereby providing a flowpath for the gaseous medium from the heatable combustion chamber through the input chamber, through the main chamber, through the output chamber, and into the hot gas duct, the main chamber having an inlet opening for receiving the gaseous medium from the input chamber, the output chamber having an outlet opening for discharging the gaseous medium into the hot gas duct; and
        a hollow cylinder for guiding the gaseous medium in the main chamber of the reaction chamber, the hollow cylinder having an axis and extending through the main chamber in a longitudinal direction, the hollow cylinder including a radially outer surface, with respect to the axis of the hollow cylinder, and a radially inner surface, with respect to the axis of the hollow cylinder, and at least one wall opening extending through the radially outer surface and the radially inner surface, such that the gaseous medium can flow through the at least one wall opening, the at least one wall opening fluidly connecting the main chamber and the output chamber, the inlet opening of the main chamber being laterally offset relative to the axis of the hollow cylinder to provide angular momentum to the gaseous medium relative to the axis of the hollow cylinder as the gaseous medium flows from the input chamber into the main chamber, the inlet opening configured to cause the gaseous medium to flow in a cyclone flow about, and in contact with, the radially outer surface of the hollow cylinder within the main chamber, the cyclone flow having a cyclone axis extending in the lonaitudinal direction;

the energy generation system further comprising:

a gas turbine unit connected to the hot gas duct of the apparatus, the gas turbine unit including a turbine duct;

wherein the hot gas duct includes a pipe having a gas turbine connecting section held in a fixed bearing, the gas turbine connecting section including a pipe body projecting into the turbine duct, a portion of the pipe body being surrounded by a compensator having a molded section that mates with a molded section of the turbine duct.

26. The energy generation system as defined in claim 25, wherein the gas turbine unit includes a turbine and a compressor, the compressor configured to feed the gaseous medium into the apparatus, the turbine being coupled to the compressor.

27. The energy generation system as defined in claim 25, wherein the gaseous medium contains volatile organic components.

28. The energy generation system as defined in claim 25, wherein the second longitudinal axis is laterally offset from the first longitudinal axis.

* * * * *

UNITED STATES PATENT AND TRADEMARK OFFICE
CERTIFICATE OF CORRECTION

PATENT NO. : 10,151,488 B2
APPLICATION NO. : 14/833822
DATED : December 11, 2018
INVENTOR(S) : Axel Widenhorn and Roland Stoll It is certified that error appears in the above-identified patent and that said Letters Patent is hereby corrected as shown below:

In the Claims

Column 15, Line 60 (Claim 1): Replace "and a radial" with --and a radially--.

Column 18, Line 14 (Claim 21): Replace "in claim 1" with --in claim 6--.

Column 18, Line 16 (Claim 22): Replace "in claim 1" with --in claim 6--.

Column 18, Line 19 (Claim 23): Replace "in claim 1" with --in claim 6--.

Signed and Sealed this
Nineteenth Day of March, 2019

Andrei Iancu
*Director of the United States Patent and Trademark Office*